US008829908B2

(12) United States Patent
Roshtal et al.

(10) Patent No.: US 8,829,908 B2
(45) Date of Patent: *Sep. 9, 2014

(54) INDUCTION COIL IMPEDANCE MODELING USING EQUIVALENT CIRCUIT PARAMETERS

(71) Applicant: Schlumberger Technology Corporation, Sugar Land, TX (US)

(72) Inventors: Richard A. Roshtal, Richmond, CA (US); Hong Zhang, El Sobrante, CA (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/742,069

(22) Filed: Jan. 15, 2013

(65) Prior Publication Data

US 2013/0141103 A1 Jun. 6, 2013

Related U.S. Application Data

(62) Division of application No. 12/405,187, filed on Mar. 16, 2009, now Pat. No. 8,362,780.

(51) Int. Cl.
*G01V 3/10* (2006.01)
*G01V 3/28* (2006.01)
*G01V 3/02* (2006.01)
*G06F 17/00* (2006.01)
*G01V 3/00* (2006.01)

(52) U.S. Cl.
CPC .. *G01V 3/02* (2013.01); *G01V 3/28* (2013.01); *G06F 17/00* (2013.01)
USPC .......................................... 324/339; 324/338

(58) Field of Classification Search
USPC .................................................. 324/323–375
See application file for complete search history.

(56) References Cited

U.S. PATENT DOCUMENTS 5,260,661 A 11/1993 Vail
6,294,917 B1 * 9/2001 Nichols .......................... 324/339

(Continued)

FOREIGN PATENT DOCUMENTS

EP 1795920 A1 6/2007
WO 0120367 A1 3/2001

OTHER PUBLICATIONS

Alumbaugh, et al., "Theoretical and practical considerations for crosswell electromagnetic tomography assuming a cylindrical geometry", Geophysics, vol. 60(3), 1995, pp. 846-870.

(Continued)

*Primary Examiner* — Arleen M Vazquez
*Assistant Examiner* — Raul Rios Russo
(74) *Attorney, Agent, or Firm* — Cathy Hewitt; Jeremy Berman

(57) ABSTRACT

Methods and related systems are described for making an electromagnetic induction survey of a formation surrounding a cased section of a borehole. An electromagnetic transmitter and/or receiver is deployed into the cased section of the borehole. Electromagnetic survey measurements and impedance measurements relating to impedance of the transmitter and/or receiver are made while deployed in the section of the borehole. Compensation is made for the attenuation amplitude and/or phase in the electromagnetic survey measurements due to the conductive casing. The compensation is based on the impedance measurements and equivalent circuit parameters. The impedance measurements are correlated with numerical modeling results of a purely inductive electromagnetic transducer, and calculated equivalent circuit parameters are combined with the numerical modeling results.

20 Claims, 8 Drawing Sheets

(56) References Cited

U.S. PATENT DOCUMENTS

| | | | |
|---|---|---|---|
| 6,393,363 B1 | 5/2002 | Wilt et al. | |
| 6,534,986 B2 * | 3/2003 | Nichols | 324/339 |
| 6,597,178 B1 * | 7/2003 | Nichols et al. | 324/339 |
| 7,030,617 B2 * | 4/2006 | Conti | 324/339 |
| 8,326,536 B1 | 12/2012 | Hoff | |
| 8,456,166 B2 | 6/2013 | DePavia et al. | |
| 2006/0054354 A1 * | 3/2006 | Orban | 175/40 |
| 2009/0091328 A1 * | 4/2009 | Clark et al. | 324/338 |
| 2009/0195244 A1 | 8/2009 | Mouget et al. | |
| 2009/0281731 A1 | 11/2009 | Morrison et al. | |
| 2010/0308832 A1 * | 12/2010 | Clark et al. | 324/338 |
| 2011/0188650 A1 | 8/2011 | Singaliese et al. | |
| 2011/0204896 A1 | 8/2011 | Zhang et al. | |

OTHER PUBLICATIONS

DePavia, et al., "Next Generation Crosswell EM Imaging Tool", SPE Annual Technical Conference and Exhibition, Denver, Colorado, 2008, 11 pages.

Spies, et al., "Sensitivity analysis of crosswell electromagnetics", Geophysics, vol. 60(3), 1995, pp. 834-845.

Wilt, et al., "Crosswell electromagnetic tomography: system design considerations and field results", Geophysics, vol. 60(3), 1995, pp. 871-885.

* cited by examiner

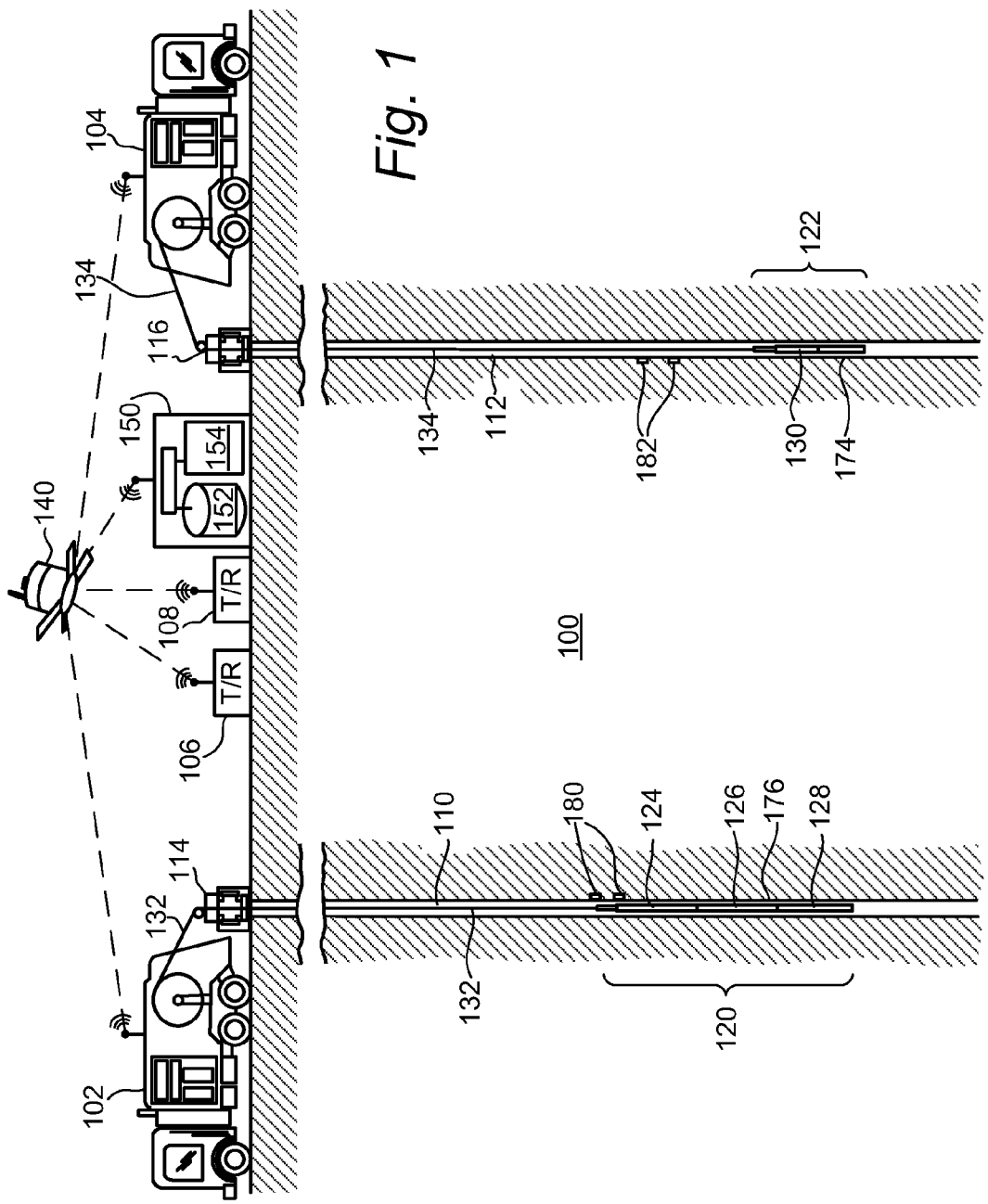

INDUCTION COIL IMPEDANCE MODELING USING EQUIVALENT CIRCUIT PARAMETERS

BACKGROUND

1. Field

This patent specification relates to electromagnetic measurements made in connection with boreholes. More particularly, this patent specification relates to methods and systems for correcting for or determining attenuation and/or phase due to a conductive casing of a borehole used in making electromagnetic measurements.

2. Background

Cross-well electromagnetic surveys have been used in the past to map the formation between two wells in oil-field environments. There are many papers in this area, among the earliest ones are modeling studies in 1995 by B. R. Spies and T. M. Habashy (see, B. R. Spies and T. M. Habashy, Sensitivity analysis of crosswell electromagnetics, Geophysics, Vol. 60, No. 3, P. 834-845 (1995)), by D. Alumbaugh and H. F. Morrison (see, David L. Alumbaugh and H. Frank Morrison, Theoretical and practical considerations for crosswell electromagnetic tomography assuming a cylindrical geometry, Geophysics, Vol. 60, No. 3, 1995, P. 846-870), and experimental studies by M. J. Wilt et al. (see, M. J. Wilt, D. L. Alumbaugh, H. F. Morrison, A. Becker, K. H. Lee and M. Deszcz-Pan, Crosswell electromagnetic tomography: system design considerations and field results, Geophysics, Vol. 60, No. 3, 1995, P. 871-885). More recently, regarding a new generation crosswell EM system, see Luis DePavia, Ping Zhang, David Alumbaugh, Cyrille Levesque, Hong Zhang and Richard Rosthal, Next generation cross-well EM imaging tool, SPE, 2008. Surface to borehole EM has also been considered, for example, to track water fronts in $CO_2$ and water injection oil fields.

Among the above technologies, it is often the case where at least one tool string needs to be put into metallic cased wells for data collection within depths of interest. The inhomogeneities of well casing, both in thickness, diameters, and electromagnetic properties, make it challenging to remove these casing imprints on EM data in order to get high resolution inversion images. There are some known methods related to casing imprints removal. For example, see U.S. patent application Ser. No. 12/996,524 (Provisional US. Patent Application Ser. No. 61/075,913 filed on Jun. 26, 2008), and U.S. patent application Ser. No. 12/117,089 (U.S. patent application Ser. No. 12/117,089, filed May 8, 2008) hereinafter referred to as "the '089 application," and incorporated herein by reference.

The casing correction described in the '089 application Patent Application involves using numerical modeling codes to calculate the casing attenuation and coil impedance to build up a look-up table, and then search for the corresponding metallic casing attenuation factor for the measured impedance at given frequencies.

SUMMARY

According to some embodiments, a method is provided for making an electromagnetic survey of a formation surrounding a borehole having casing. The method includes deploying an electromagnetic transducer into a section of the borehole that is cased with a conductive casing. Impedance measurements relating to impedance of the electromagnetic transducer are made while deployed in the section of the borehole. Electromagnetic survey measurements of the formation are made with the electromagnetic transducer. Compensation is made for the attenuation and/or phase (or real and/or imaginary effects) in the electromagnetic survey measurements due to the conductive, and possibly magnetic, casing. The compensation is based at least in part on the impedance measurements and one or more calculated equivalent circuit parameters.

According to some embodiments, the compensation includes correlating the impedance measurements with numerical modeling results of a purely inductive electromagnetic transducer, and combining the one or more calculated equivalent circuit parameters with the numerical modeling results. As used here the term "transducer" means any device that converts one type of energy or physical attribute to another for various purposes including measurement or information transfer. As used herein, the term "transducer" thus includes electromagnetic sensors and/or receivers as well as transmitters.

According to some other embodiments, a system is provided for making electromagnetic survey measurements of a formation surrounding a borehole having a casing. The system includes an electromagnetic transducer deployable into a section of the borehole that is cased with a conductive casing such that the electromagnetic survey measurements and impedance measurements relating to the impedance of the electromagnetic transducer while deployed in the section of the borehole can be made. A processing system is configured and arranged to compensate for attenuation and/or phase of the electromagnetic survey measurements due to the conductive casing, the compensation being based at least in part on the impedance measurements and one or more calculated equivalent circuit parameters.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein:

FIG. 1 is a schematic showing an electromagnetic induction survey system in accordance with embodiments of the disclosure;

DETAILED DESCRIPTION OF THE PREFERRED EMBODIMENTS

Figure 3:
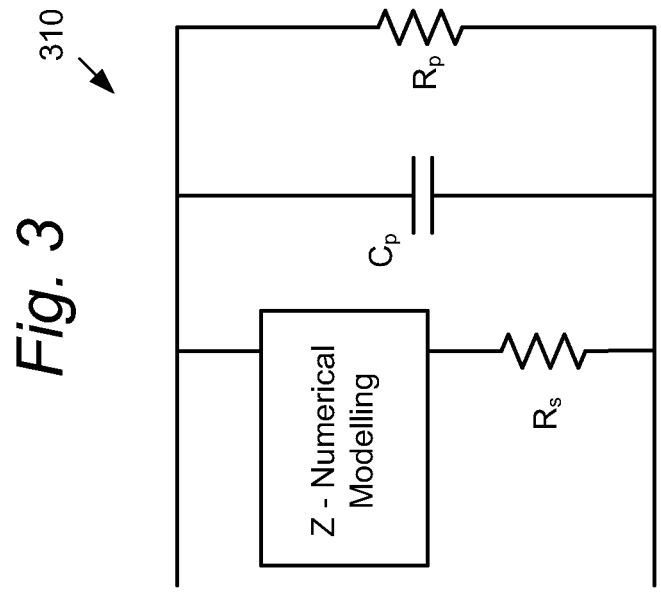
FIG. 3 is a schematic of a four-parameter equivalent circuit model 310 of an induction coil in metallic casing, according to embodiments.

In the following detailed description of the preferred embodiments, reference is made to accompanying drawings, which form a part hereof, and within which are shown by way of illustration specific embodiments by which the disclosure may be practiced. It is to be understood that other embodiments may be utilized and structural changes may be made without departing from the scope of the disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice. Further, like reference numbers and designations in the various drawings indicated like elements.

Embodiments described herein are related to crosswell, surface-to-borehole and single well electromagnetic induction logging in metallic cased wells. Means are described for correlating induction coil impedance measurement results with numerical modeling results of a purely inductive coil. This is accomplished by using a proper equivalent circuit model of the coil impedance, both in air and in metallic well casings, with the inductance value being substituted by calculated value using numerical modeling codes. This will, in turn, allow real-time casing corrections during crosswell, surface-to-borehole, and single-well induction loggings.

FIG. 1 is a schematic showing an electromagnetic induction survey system in accordance with embodiments of the present disclosure. Boreholes 110 and 112 are in subterranean formation 100. Wireline toolstring 120 is deployed in borehole 110 from wireline truck 102 using cable 132 via wellhead 114. Similarly, wireline toolstring 122 is deployed in borehole 112 from wireline truck 104 using cable 134 via wellhead 116. Borehole 110 is shown cased with casing 176 in the vicinity of toolstring 120, and borehole 112 is shown cased with casing 174 in the vicinity of toolstring 122. Surface stations TSS (Transmitter Surface Station) and RSS (Receiver Surface Station) inside Trucks 102 and 104 communicate with each other and/or other surface components and systems via communication with satellite 140 or other known wireless or wired means. Toolstring 120 includes several components, such as receivers 124, 126 and 128. Toolstring 122 includes transmitter 130. According to some embodiments, surface transmitters and/or receivers 106 and 108 are used instead of, or in addition to either of the downhole tool strings 120 and 122 when performing surface-to-borehole or borehole-to-surface electromagnetic induction surveys. According to some embodiments, processing system 150 is connected either to the TSS and/or RSS, and is used to process the measured data. System 150 includes one or more processors 154 and a storage system 152 that can include various types of storage including volatile memory such as primary random access memory, and non-volatile memory such as read-only memory, flash memory, magnetic computer storage devices such as hard disks, floppy disks, and magnetic tape, and optical discs such as CD ROMS, DVD ROMS. According to some embodiments, a processing system such as processing system 150 is incorporated into the TSS and/or RSS. It is also recognized that communication between the TSS and RSS is not necessary; as long as the TSS and RSS can be synchronized by reference to the same time standard (as for instance the GPS satellite system), data can be stored for later processing.

Deep sensing induction tools such as transmitter 130 on toolstring 122 broadcast an electromagnetic field into a conductive media including formation 100 and measure the attenuation and phase shift of the electromagnetic field at a receiver coil such as receivers 124, 126 and 128 in toolstring 120 located at some distance away from the transmitter 130. The positions of the transmitters and receivers are then changed throughout a whole reservoir region within formation 100, as well as above and below the reservoir, to provide a set of magnetic field measurements, including amplitude and phase, that have sensitivity to various spatial positions within the reservoir. The data are then processed in processing system 150 (or in the TSS and/or RSS) and inverted to provide data without the casing imprints when the transmitter 130 or the receivers 124, 126 and 128 are inside a conductive and/or magnetic casing such that the data 'look' like open hole data. A resistivity distribution around the borehole or between the boreholes 110 and 112 can then be inverted from the corrected data.

While the use of two wireline units is primarily shown in FIG. 1, according to other embodiments the techniques described herein are practiced using permanent transmitters such as transmitters 182 and/or permanent receivers such as receivers 180 in one or both wells or using sensors deployed while drilling. For further detail on permanent electromagnetic measurement systems, see U.S. Pat. No. 6,534,986 which is incorporated herein by reference. According to yet other embodiments, the transmitter and receiver can be located in a single well. For example, receiver 124 is instead a transmitter, while receivers 126 and 128 remain receivers. For further detail on single-well electromagnetic measurement systems see, U.S. Pat. No. 8,456,166, filed Jun. 15, 2009, which claims priority to Application Ser. No. 61/119, 282, filed Dec. 2, 2008, which is incorporated herein by reference.

Figure 2:
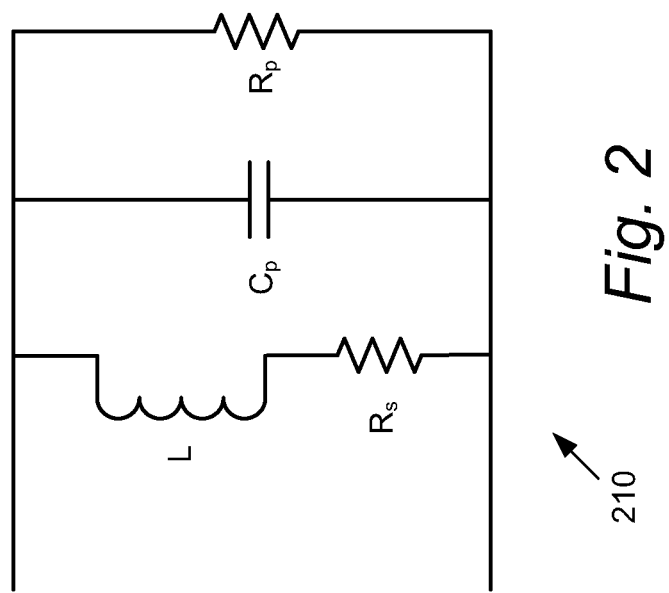
FIG. 2 is a schematic of a four-parameter equivalent circuit model of an induction coil in air.

According to some embodiments, a definition is made of a proper equivalent circuit of a receiver coil with a magnetic core in air/vacuum. FIG. 2 is a schematic of a four-parameter equivalent circuit model of an induction coil in air. L is the coil inductance, $R_s$ is the winding resistance, $C_p$ is the stray capacitance of the winding, and $R_p$ is the core loss resistance. The four-parameter circuit model 210 is used to fit the experimental impedance data to obtain the values of the circuit parameters. In order to adequately simulate the frequency dependence of a transmitter or receiver coil impedance, a series resistor $R_s$ is included for the resistance of the wire and a parallel capacitance for the distributed winding-to-winding capacitance. When the coil has a magnetic core in it, a parallel resistance $R_p$ should be included to account for the losses in the core. Note that for an air cored coil, the parameter $R_p$ can be omitted and a three parameter model fits the data.

There are three observations that form the basis of the embodiment described herein. These observations were made in lab measurements with a test coil.

First, a four-parameter circuit model can describe the receiver main winding impedance in air. The main winding impedance was measured in air from 40 Hz to 1 KHz. The data were fit to the four-parameter circuit model 210 as shown in FIG. 2. One of the circuit parameters $R_s$ is the DC resistance of the main winding, and was measured using an ohmmeter at room temperature. The other three parameters, winding inductance L, winding stray capacitance $C_p$, and parallel resistor $R_p$ representing the core losses, were obtained via the best data fitting. The parameter $R_s$ is preferably measured separately in cases where the impedance analyzer does not accurately measure below 40 Hz. For example, at 40 Hz, the inductive impedance, $\omega L$ is approximately 50,000 ohm, while $R_s$ is only 600 ohm. This makes it difficult to accurately fit for parameter $R_s$. If an impedance analyzer is used that is capable of measuring much lower frequencies, separate measurement of $R_s$ would be unnecessary.

Second, the coil was placed into a metallic casing, and the main winding impedance was measured at the same frequency range. Due to the presence of the conductive and/or magnetic casing, the apparent impedance of the main winding is dramatically different from the impedance of the main winding in air.

Third, the effect of casing can be included into an effective component Z in an equivalent circuit. FIG. 3 is a schematic of a four-parameter equivalent circuit model 310 of an induction coil in metallic casing, according to embodiments. Z is an effective component, representing the impedance of a coil in metallic casing calculated using numerical modeling codes; $R_s$ is the coil winding resistance, $C_p$ is the stray capacitance measured in air, and $R_p$ is the same core loss resistance obtained from impedance measurement in air. $R_s$, C, and $R_p$ are the same value as obtained through impedance measurement in air as described with respect to FIG. 2.

The effective inductance was calculated using a 2D numerical modeling code, with the presence of the metallic casing. Electromagnetic modeling codes such as finite element and/or finite difference analysis software can be used. Examples of commercially available numerical electromagnetic (EM) modeling software packages that are suitable for generating the relationships include: MagNet finite element analysis simulation software from Infolytica Corporation, and Comsol Multiphysics® software from Comsol AB.

The electrical conductivity and/or magnetic permeability of the metallic casing are adjustable parameters, with their true values being the best fit of the calculated impedance of equivalent circuit in FIG. 3 and the measured value. This EM modeling is for a perfect coil in casing. It includes the ohmic losses due to the casing (some but not all EM modeling code may be able to include magnetic hysteresis losses of casing), but does not include the wire resistance, stray capacitance or most of the core losses.

The techniques described herein allow for direct comparisons between calculated induction coil impedance using numerical codes to measured impedance of a real induction coil.

According to some embodiments, the main winding impedance of an induction coil with a magnetic core and the DC resistance are measured in air/vacuum, and the data were fit to the four-component circuit model 210 to obtain the winding inductance, the winding stray capacitance, and the core loss resistance. When the same coil is put inside a metallic casing, the measured main winding impedance data can be described with the four component circuit model 310, with the winding inductance L being replaced by the impedance calculated using numerical modeling codes. The approximation is valid only if the capacitance between the coil and the metallic casing is negligible, and if the magnetic hysteresis losses in the casing is negligible comparing to the ohmic losses in the casing, so that the Rp value obtained from impedance in measurement in air in circuit model 210 can be used in circuit model 310. It has been found that most of the EM modeling codes include the conductive losses in the casing, but not the magnetic hysteresis losses in the casing. In general, the ohmic losses in the casing are much larger than the magnetic hysteresis losses in the casing.

The modeling provides the Z, which depends upon the parameters of the casing (magnetic permeability, electrical conductivity, wall thickness, and outer diameter), as well as the frequency of operation. The measured impedance of the sensor depends upon those casing parameters as well as the electrical parameters of the sensor itself. Thus, a means to relate the modeled results to the measured results is provided. By varying the casing parameters in the model, we can find the set of parameters that best fit the measurements in casing and thus determine the casing parameters.

Modeling for the examples described herein were performed with a 2D finite element electromagnetic modeling code. In the examples, we used the code to model an azimuthally symmetric situation. In this case, we were interested in modeling the impedance of a coil with a magnetic core. The parameters correspond to a test sensor for use in the laboratory.

The modeling code works such that a source is specified as a collection of delta function currents with coordinates r and z. Then, the azimuthal electric field is calculated everywhere. Then the impedance is defined as Z=-V/I. The negative polarity arises from the fact that the modeling code used calculates the voltage induced by the current, which is the negative of the voltage that is necessary to make the current flow. When we are interested in calculating the impedance, the desired electric field is along the same positions as the current sources.

Various methods can be used to calculate the values for the equivalent circuit parameters. According to some embodiments a non-linear least-squares optimization routine in MATLAB was used to estimate the values. The MATLAB routine takes as input the impedance vs. frequency data as measured by an impedance analyzer and fits for the circuit parameters. A feature of this MATLAB code is that it allows any of the parameters to be fixed values. Thus, for instance, it may be very difficult to estimate the series resistor ($R_s$) for a coil having a core, due to the fact that the inductance is very large, nearly 200 Henrys. Even at very low frequencies, this can correspond to an impedance of 50,000 ohms. Thus, it can be difficult to accurately fit for the resistance in series with that large impedance. On the other hand, it is relatively easy to measure the DC resistance of that circuit and to fix the series resistance at that value.

Figure 4:
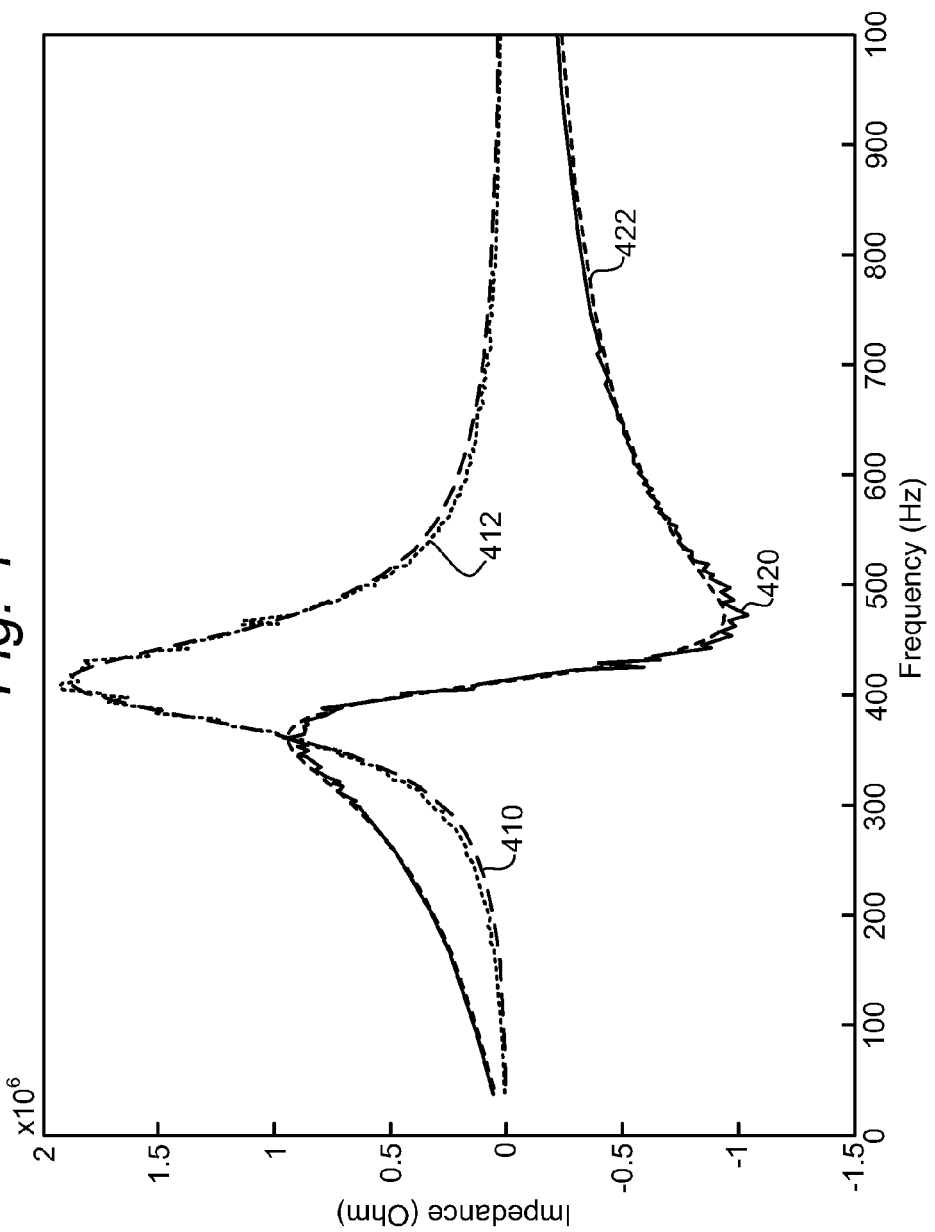
FIG. 4 shows a typical fit of modeled impedance to measured impedance for a transmitter or receiver coil with a magnetic core in air/vacuum, according to some embodiments.

FIG. 4 shows a typical fit for a receiver coil with a magnetic core, according to some embodiments. Curve 410 is the real portion of the model, curve 412 is the measured real portion of coil impedance, curve 422 is the imaginary portion of the model and curve 420 is the measured imaginary portion of coil impedance. As we can see, the fit is extraordinary, with $R^2$ values in excess of 0.99. In this case, we define $R^2$ as:

$$R^2 = 1 - \frac{\sum (z_{measure} - z_{model})^2}{\sum (z_{measure})^2}$$

Such a value of $R^2$ indicates that the modeled impedance is very close to the actual impedance. In this case, we have set $R_s$ equal to the measured DC value of 1082Ω. An inductance of 192.6 H, a parallel capacitance of 771 pF and a parallel resistance of 1.90 MΩ were obtained. The EM modeling calculated inductance for this example is 202.4 H. This is an error of only 5 percent due to the magnetic core, which is an excellent result given the approximations made (as described in paragraph [0032]).

Figure 5:
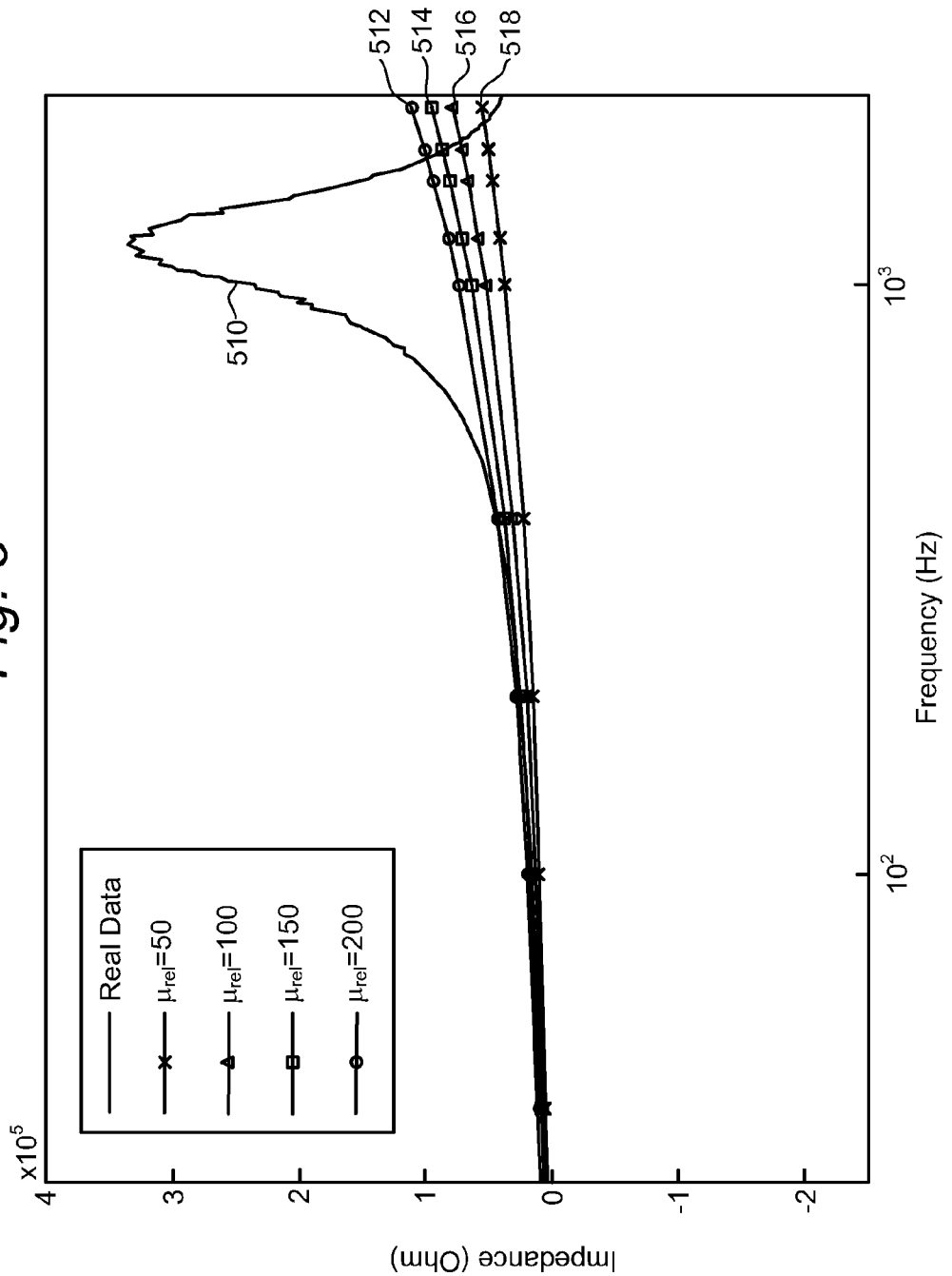
FIGS. 5 and 6 are plots showing real and imaginary part of numerical modeling results of a perfect coil with various casing relative magnetic permeabilities.
Figure 6:
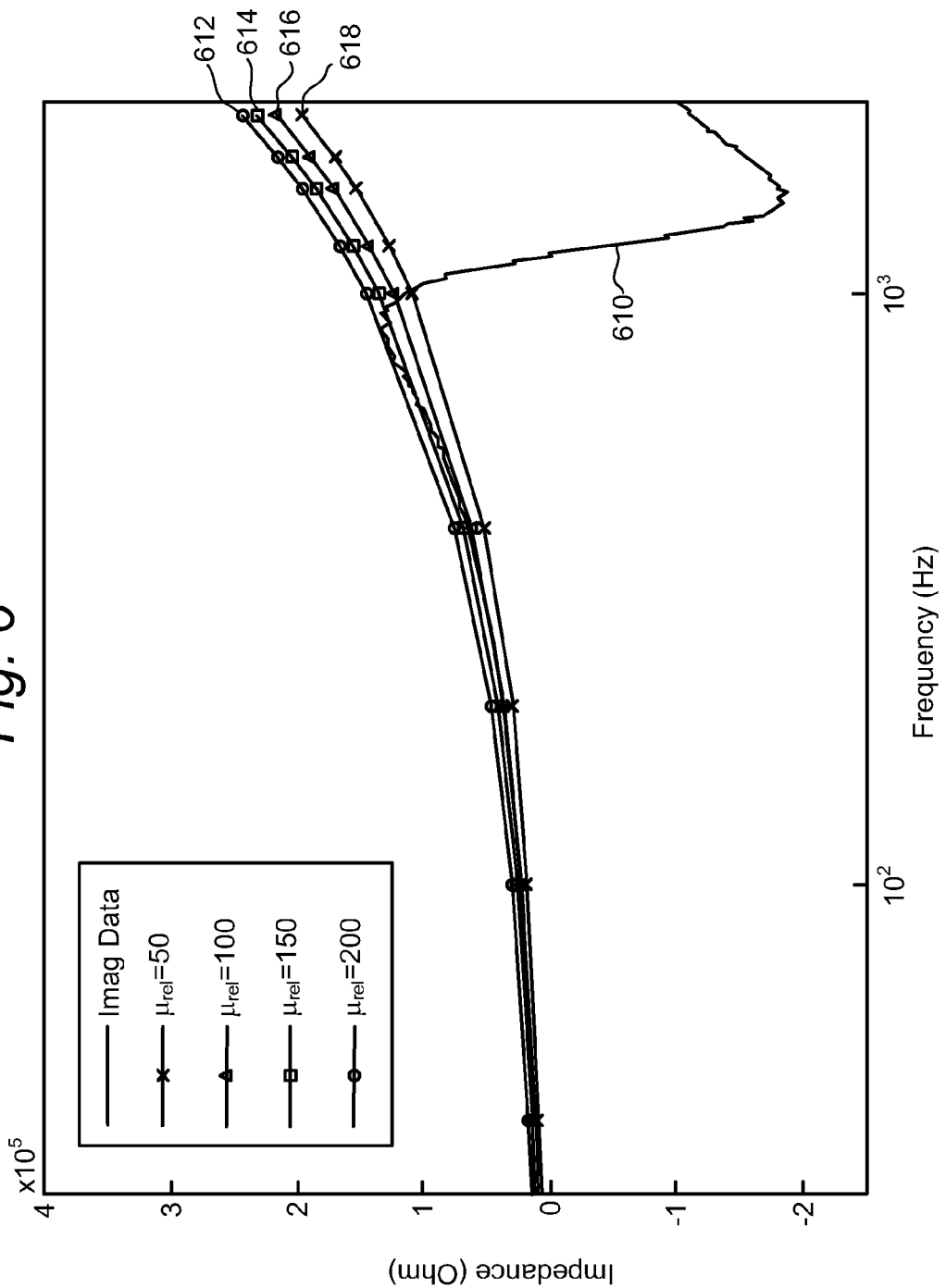

FIGS. 5 and 6 are plots showing real and imaginary parts of numerical modeling results of a perfect coil with various casing relative magnetic permeabilities. Here we add to the previous model for the coil having a magnetic core, a cylindrical shell corresponding to the casing. In this case, the casing has an inner diameter (ID) of 6.40" and an outer diameter (OD) of 7". The electrical and magnetic properties are not known exactly. Casing corrosion studies indicate that the magnetic permeability varies more than the electrical conductivity. For this reason, we have used an electrical conductivity of $6.41 \times 10^6$ (resistivity of $1.56 \times 10^{-7}$ Ωm) and have let $\mu_{rel}$ vary between 50 and 200. The results for the real and imaginary parts of the impedance are show in FIGS. 5 and 6 together with the data. In FIG. 5, curve 510 is the measured real portion, curve 512 is the modeled real portion for $\mu_{rel}$=200, curve 514 is the modeled real portion for $\mu_{rel}$=150, curve 516 is the modeled real portion for $\mu_{rel}$=100, and curve 518 is the modeled real portion for $\mu_{rel}$=50. In FIG. 6, curve 610 is the measured imaginary portion, curve 612 is the modeled imaginary portion for $\mu_{rel}$=200, curve 614 is the modeled imaginary portion for $\mu_{rel}$=150, curve 616 is the modeled imaginary portion for $\mu_{rel}$=100, and curve 618 is the modeled imaginary portion for $\mu_{rel}$=50. We see from FIGS. 5 and 6 that there is poor agreement.

The reason for the disagreement is apparent, in that the numerical modeling was for a perfect coil. We are attempting to measure the impedance of a real circuit with imperfect circuit elements. Just as the circuit 210 of FIG. 2 was necessary to fit the data, we need to include all the other elements of the circuit in order to simulate this response. We do that by modifying the circuit to that of circuit 310 in FIG. 3, namely by substituting the numerical modeling result for the impedance of the coil.

Thus, we model the coil with a core in casing. This results in a complex impedance which includes the effect of the casing. We then substitute the complex modeled result for that of a perfect coil. We then construct a circuit that includes the series resistance, parallel resistance, and parallel capacitance. We will assume that these values are the same as the values without casing. In this case, the most pretinent parameter is the parallel capacitance. When these other parts of the circuit are included, the results are more accurate. For another sensor or another circuit, other of the circuit parameters might be more useful.

Figure 7:
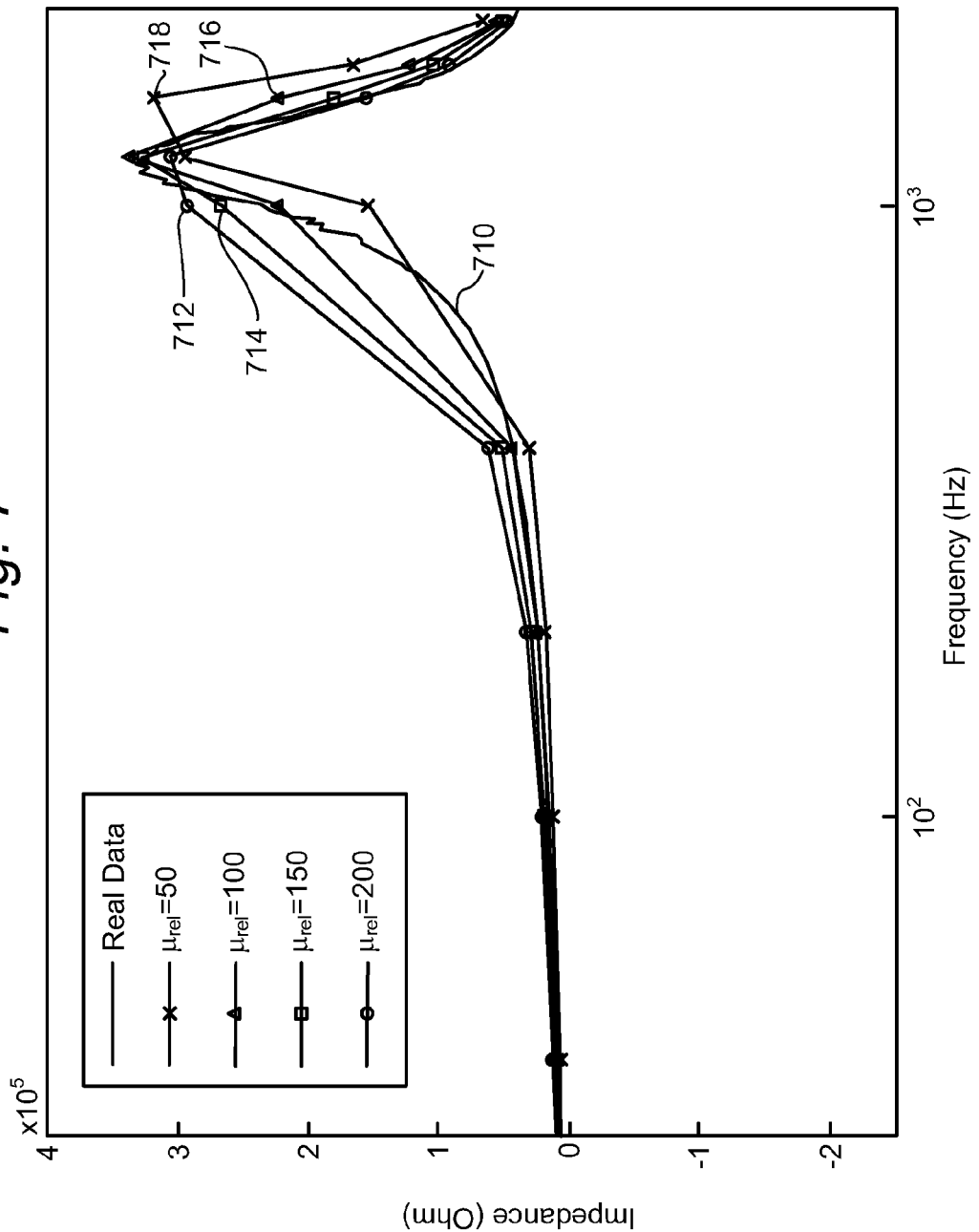
FIGS. 7 and 8 are plots comparing measured and calculated real and imaginary impedance for a magnetic core coil in casing, according to embodiments.
Figure 8:
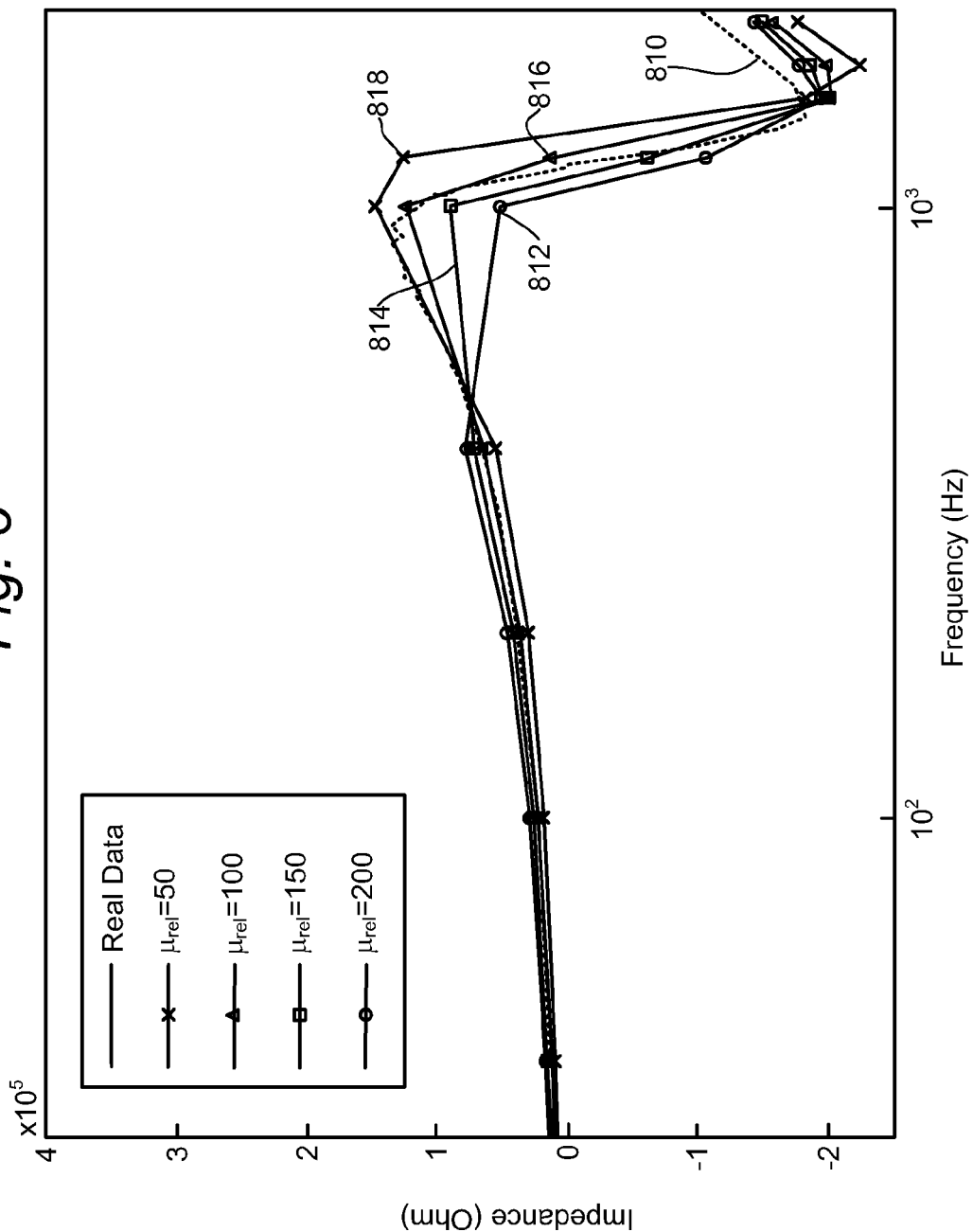

FIGS. 7 and 8 are plots comparing measured and calculated real and imaginary parts of the impedance for a magnetic core coil in casing, according to embodiments. As in the previous case, the casing has an ID of 6.40" and an OD of 7", electrical conductivity is $6.41 \times 10^6$ (resistivity of $1.56 \times 10^{-7}$ Ωm), and $\mu_{rel}$ varies between 50 and 200. In FIG. 7, curve 710 is the measured real portion of the data, curve 712 is the calculated real portion for $\mu_{rel}$=200, curve 714 is the calculated real portion for $\mu_{rel}$=150, curve 716 is the calculated real portion for $\mu_{rel}$=100, and curve 718 is the calculated real portion for $\mu_{rel}$=50. In FIG. 8, curve 810 is the measured imaginary portion of the data, curve 812 is the calculated imaginary portion for $\mu_{rel}$=200, curve 814 is the calculated imaginary portion for $\mu_{rel}$=150, curve 816 is the calculated imaginary portion for $\mu_{rel}$=100, and curve 818 is the calculated imaginary portion for $\mu_{rel}$=50. These figures show that when the other parameters of the circuit are included, it is possible to obtain a good fit to the data, even when frequencies pass through the resonance peak of the coil. The figures also show that the shape of the curves are influenced by the magnetic permeability of the casing. Different permeabilities result in different frequency dependence for the impedance. The best fit here is achieved with a magnetic permeability of $\mu_{rel}$=100.

Thus the response of a transmitter and/or receiver coil with magnetic core in casing can be successfully modeled. The response is different from the results obtained only using an EM modeling code. The electrical characteristics of the circuit are included in order to understand the results. The response is well modeled even through the circuit resonance. There is a strong dependency upon the casing characteristics.

Figure 10:
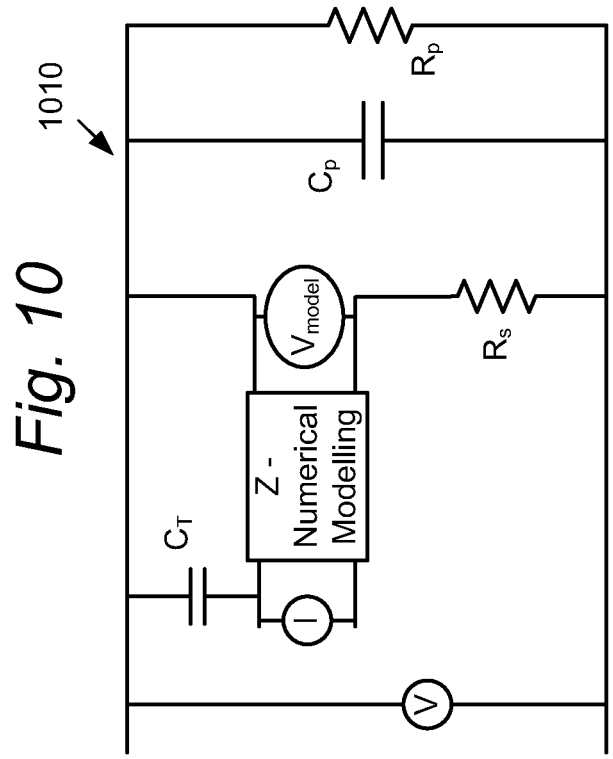
FIG. 10 shows an equivalent circuit of trans-impedance model in casing, according to embodiments.
Figure 9:
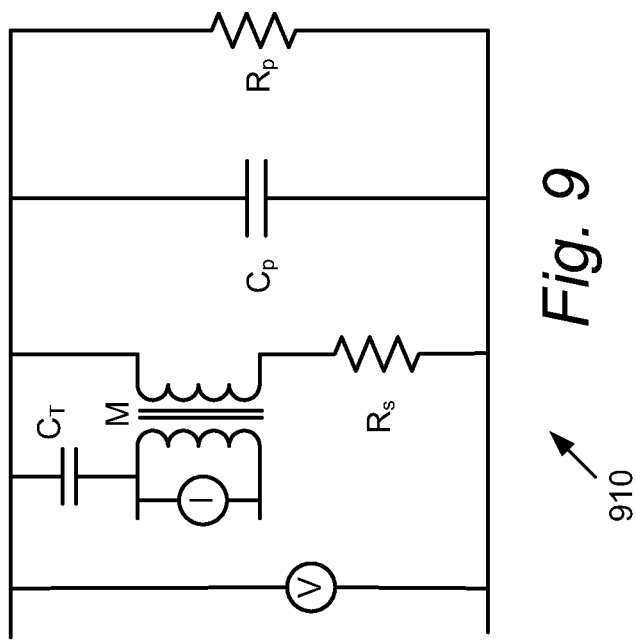
FIG. 9 shows an equivalent circuit of trans-impedance in air, according to embodiments.

While much of the description above applies to measurements using direct-impedance modeling, according to other embodiment the techniques described herein also apply to trans-impedance measurements where the current in the primary coil and the voltage in the secondary coil are measured. For further detail on trans-impedance electromagnetic measurement techniques, see U.S. Provisional Patent Application Ser. No. 61/075,713, filed on Feb. 19, 2009, which is hereby incorporated by reference herein. In FIG. 1, for example, each of the receivers 124, 126 and 128 have a coil consisting of a main winding and a feedback winding. The feedback windings can be driven simultaneously at a low level while measuring induced voltages on the main winding of each receiver. The output of the measurements is the trans-impedance between the main winding and its own feedback winding. FIG. 9 shows an equivalent circuit of trans-impedance in air. As can be seen, the equivalent circuit can be described with a five-parameter circuit model 910, where $Z_{trans}$=V/I. Similarly, FIG. 10 shows an equivalent circuit of trans-impedance model 1010 in casing. Referring to FIGS. 9-10, a person of ordinary skill in the art will understand how to apply the foregoing examples to the trans-impedance setting.

Whereas many alterations and modifications of the present disclosure will no doubt become apparent to a person of ordinary skill in the art after having read the foregoing description, it is to be understood that the particular embodiments shown and described by way of illustration are in no way intended to be considered limiting. Further, the disclosure has been described with reference to particular preferred embodiments, but variations within the spirit and scope of the disclosure will occur to those skilled in the art. It is noted that the foregoing examples have been provided merely for the purpose of explanation and are in no way to be construed as limiting of the present disclosure. While the present disclosure has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present disclosure in its aspects. Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A system for making electromagnetic survey measurements of a formation surrounding a borehole having a casing comprising:

an electromagnetic transducer deployable into a section of the borehole that is cased with a conductive casing, the electromagnetic transducer operable to take the electromagnetic survey measurements and at least one impedance measurement relating to the impedance of the electromagnetic transducer while deployed in the section of the borehole; and a processing system configured and arranged to compensate for attenuation and/or phase of the electromagnetic survey measurements due to the conductive casing, the compensation being based at least in part on the impedance measurement and one or more equivalent circuit parameters.

2. A system according to claim 1 wherein the one or more equivalent circuit parameters are selected from the group consisting of inductance, resistance, conductance, capacitance, elastance, reluctance and reactance.

3. A system according to claim 1 wherein the compensation includes an association of the impedance measurements with numerical modeling results of a purely inductive electromagnetic transducer.

4. A system according to claim 3 wherein the compensation is based at least in part on a combination of the one or more equivalent circuit parameters and the numerical modeling results.

5. A system according to claim 1 wherein the electromagnetic transducer is an electromagnetic transmitter.

6. A system according to claim 1 wherein the electromagnetic transducer is an electromagnetic receiver.

7. A system according to claim 1 further comprising a second electromagnetic transducer deployable into a section of a second borehole, wherein the electromagnetic survey measurements are made by transmitting and receiving between the boreholes using the transducers.

8. A system according to claim 1 further comprising a second electromagnetic transducer deployable on the surface, wherein the electromagnetic survey measurements are made by transmitting and receiving between surface and the borehole using the transducers.

9. A system according to claim 1 further comprising a second electromagnetic transducer deployable into the section of the borehole, wherein the electromagnetic survey measurements are made by transmitting and receiving between the electromagnetic transducer and second electromagnetic transducer while in the section of the borehole.

10. A system according to claim 1 wherein the electromagnetic transducer is permanently or semi-permanently installed in the section of the borehole.

11. A system according to claim 1 wherein the processing system is further configured and arranged to derive electrical, magnetic and/or physical properties of the casing based at least in part on the impedance measurement and the one or more equivalent circuit parameters.

12. A system according to claim 1 wherein the impedance measurements include measurements of trans-impedance between a first winding and a second winding within the electromagnetic transducer.

13. A method for making electromagnetic survey measurements of a formation surrounding a borehole having a casing comprising:
    deploying an electromagnetic transducer into a section of the borehole that is cased with a conductive casing, and operating the electromagnetic transducer to take the electromagnetic survey measurements and at least one impedance measurement relating to the impedance of the electromagnetic transducer; and
    compensating for attenuation and/or phase of the electromagnetic survey measurements due to the conductive casing, the compensation being based at least in part on the impedance measurement and one or more equivalent circuit parameters, using a processing system.

14. A method according to claim 13 wherein the one or more equivalent circuit parameters are selected from the group consisting of inductance, resistance, conductance, capacitance, elastance, reluctance and reactance.

15. A method according to claim 13 wherein the compensation includes an association of the impedance measurements with numerical modeling results of a purely inductive electromagnetic transducer.

16. A method according to claim 15 wherein the compensation is based at least in part on a combination of the one or more equivalent circuit parameters and the numerical modeling results.

17. A method according to claim 13 wherein the electromagnetic transducer is an electromagnetic transmitter.

18. A method according to claim 13 wherein the electromagnetic transducer is an electromagnetic receiver.

19. A method according to claim 13 further comprising deriving electrical, magnetic and/or physical properties of the casing based at least in part on the impedance measurement and the one or more equivalent circuit parameters, using the processing system.

20. A method according to claim 13 wherein the impedance measurements include measurements of trans-impedance between a first winding and a second winding within the electromagnetic transducer.

* * * * *